United States Patent Office 3,356,641
Patented Dec. 5, 1967

3,356,641
DIGLYCOL TEREPHTHALATE POLYESTERS PREPARED BY POLYCONDENSATION IN THE PRESENCE OF ZINC HEXAFLUOROSILICATE CATALYST AND OPTIONALLY CONTAINING A MANGANESE SALT AS A LIGHT STABILIZING AGENT
Hilmar Roedel, Elsenfeld, Erhard Siggel, Laudenbach am Main, Lothar Riehl, Oberbruch, Rhineland, and Walter Rein, Obernburg (Main), Germany, assignors to Vereinigte Glanzstoff-Fabriken AG, Wuppertal-Elberfeld, Germany
No Drawing. Filed Mar. 3, 1964, Ser. No. 349,140
Claims priority, application Germany, Mar. 9, 1963, V 23,778
9 Claims. (Cl. 260—45.75)

This invention is concerned with the production of linear fiber-forming polyesters as obtained from terephthalic acid or its lower alkyl esters and a diglycol by esterification and polycondensation reactions. In particular, the invention relates to an improvement in the production of such polyesters by the use of a specific catalyst.

It is well known that polyesters having fiber-forming properties can be produced from terephthalic acid or its esterified derivatives by polycondensation of a suitable diglycol terephthalate under reduced pressure and at elevated temperatures. In some cases, terephthalic acid is esterified directly with the glycol component, but more commonly the dialkyl ester such as dimethyl terephthalate is first transesterified with the glycol and the resulting diglycol terephthalate is then polycondensed to form the desired fiber-forming polyester product. The transesterification or ester-interchange reaction has been carried out with a variety of aliphatic, cycloaliphatic and aromatic glycols, although commercial interest in these polyesters has centered primarily on the production of polyethylene terephthalate or various modifications thereof by using ethylene glycol for ester-interchange with dimethyl terephthalate as the initial reactants, thereafter polycondensing the diglycol ester.

In order to effectively carry out the known transesterification reaction as well as the subsequent polycondensation, relatively high temperatures are required and also suitable catalysts in order to shorten the reaction time. For example, in the production of polyethylene terephthalate, it has been conventional to employ zinc acetate to accelerate the ester-interchange reaction and to use antimony trioxide as the polycondensation catalyst. While these catalysts are generally sufficient, even on a technological scale, to give polyester products with desirable fiber-forming properties and a high degree of utility, the appearance of the final product is nevertheless undesirable in its coloration. Thus, while these catalysts rapidly accelerate the polyester-forming reactions and thereby tend to avoid side reactions under the high temperature conditions, the resulting polyester products still have a more or less strong yellowish or yellowish-gray discoloration which has not been capable of being avoided or masked even by the addition of large amounts of matting agents.

This discoloration of the polyester appears to be caused by certain side reactions and the resulting by-products which are practically permanently fixed into the product, and the usual catalysts such as zinc acetate and antimony trioxide are not capable of preventing such side reactions. In particular, it is believed that substances having a reducing effect, such as aldehydes are formed from mono- and di-alcohols which are present during the formation of the polyester. For example, catalysts such as antimony trioxide in the presence of ethylene glycol promote the formation of vinyl alcohol and acetaldehyde. The aldehydes, especially in the presence of such matting agents as titanium dioxide, tend to form yellowish resins, and in addition, these aldehydes have a reducing effect on the metal catalysts present so that there is a flaking or precipitation in the polyester of the catalysts in metallic form, thereby producing a gray discoloration. Because the catalyst is thus partially reduced to the metallic state, there is a perceptible decrease in catalyst efficiency. As a consequence, it is sometimes necessary to add the catalyst more than once to the reaction mixture or to initially use a relatively larger amount of the catalyst. Such measures impair both the quality and the color of the polyester.

The action of light increases or accelerates the yellow discoloration of the polyester product, apparently because the catalyst decomposition products remaining in the polymer are light sensitive or have a sensitizing effect. In order to provide a polyester product having greater stability against light, manganese salts of fatty acids or similar additives have been incorporated into the polyester. Thus, it has been suggested that manganese acetate be used as an ester-interchange catalyst for better light stability, but this compound can be used only in very small amounts. Larger amounts cause a correspondingly greater discoloration of the polyester, not only during its initial formation but also to a substantial extent during subsequent melting and extrusion or shaping of the polyester where there is a clearly visible formation of manganese dioxide.

One object of the present invention is to provide an improvement in the production of polyesters from terephthalic acid and its esterified derivatives by using a special catalyst.

Another object of the invention is to carry out the polycondensation of diglycol terephthalates with a catalyst which is capable of avoiding the undesirable discoloration and impairment of quality of the polyester product caused by more conventional catalysts.

Still another object of the invention is to provide a process for the production of linear fiber-forming polyesters by the usual transesterification and polycondensation reactions, using not only a new catalyst but also a manganese-containing light stabilizing agent while still avoiding troublesome side reactions and discoloration of the polyester.

Yet another object of the invention is to provide an improvement in the production of such linear fiber-forming polyesters whereby it is not necessary to add large amounts of matting agents to obtain a high quality product.

Moreover, it is an object of the invention to provide an improved catalyst and a light stabilizing agent in the production of said polyesters whereby the initial colorless product can be subjected to the usual melt spinning or similar shaping processes without causing discoloration and whereby the final product in the form of filaments, yarns, fabrics, films or the like have excellent resistance to discoloration.

These and other objects and advantages of the invention will be more readily apparent upon consideration of the following detailed disclosure.

In accordance with the invention, it has now been found that the production of linear fiber-forming polyesters by polycondensation of a diglycol terephthalate under conventional conditions of temperature and pressure can be accelerated in an improved manner while preventing discoloration by using as the essential polycondensation catalyst at least about 0.005% by weight, with reference to the reaction mixture, of zinc hexafluorosilicate. Not only does zinc hexafluorosilicate accelerate the polycondensation reaction to the same degree as the more commonly used antimony trioxide, but in addition, the new catalyst has the advantage of also strongly accelerating ester interchange between the lower alkyl diester of terephthalic acid and the glycol. Most importantly, the zinc hexafluorosilicate represses the formation of by-products having a reducing effect to such an extent that there is practically no formation of aldehyde resins which cause a yellowish discoloration and there is no precipitation of metallic or other catalyst decomposition products which cause a graying of the polyester.

In carrying out the polyester-forming reactions, the zinc hexafluorosilicate can be added to the reaction mixture at the beginning of or prior to the polycondensation of the diglycol terephthalate, preferably in an amount of about 0.01 to 0.1% by weight of the reaction mixture. Larger amounts of this catalyst can also be employed, but without gaining any further advantage thereby.

It is especially advantageous to use zinc hexafluorosilicate as the essential catalytic component for the ester interchange reaction as well as for the subsequent polycondensation, and it is then added at the beginning of or during the ester interchange reaction between the dialkyl terephthalate and the glycol and is carried through to the completion of the polycondensation reaction. At the beginning of the ester interchange reaction, there is a highly fluid reaction mixture and the catalyst can be easily and rapidly dispersed for intimate admixture with the reactants by simple mechanical means or by premixing with one of the reactants. This method of finely distributing the zinc hexafluorosilicate in the ester-interchange reaction mixture is especially advantageous for purposes of conducting a completely continuous process with a high throughput.

In general, it is advisable to avoid the presence of other catalysts in the process of the invention since the addition of any substantial amounts of the conventional catalysts, especially polycondensation catalysts, will only tend to cause the undesired discoloration of the polyester. Also, some transesterification catalysts are not particularly compatible with the zinc hexafluorosilicate, and alkaline earth metals or their derivatives should be avoided. On the other hand, very small amounts of other catalysts can obviously be present to the extent that they do not detract from the beneficial results achieved with zinc hexafluorosilicate.

As one exception to the general exclusion of other catalysts, the process of the present invention can be further improved by the addition of a manganese light stabilizing agent. While some manganese compounds such as manganese acetate can also be considered as transesterification catalysts, they also act as light stabilizers in the finished polyester product and are used for this latter property in the present invention. These manganese compounds do not impair or detract from the beneficial catalytic action of the zinc hexafluorosilicate but are effective in the improvement of light stability.

Manganese salts are especially suitable as light stabilizers, for example the manganese salts of fatty acids, especially those fatty acids of 2 to 6 carbon atoms, or other aliphatic carboxylic acid salts of manganese. Specific salts of this type are manganese acetate, manganese propionate, manganese capronate and the acid or neutral manganese salts of acetylene dicarboxylic acid. It is particularly advantageous to use manganese hexafluorosilicate as the light stabilizing agent in combination with zinc hexafluorosilicate as the sole transesterification and polycondensation catalyst, since there is less tendency for the manganese hexafluorosilicate to form manganese dioxide with discoloration of the polyester than is possible when using the known manganese salts.

Manganese hexafluorosilicate clearly increases the light stability of the polyester after the addition of only 0.01% by weight, with reference to the transesterification or polycondensation reaction mixture. The use of manganese hexafluorosilicate has the advantage that polyester obtained by the addition of this compound are less discolored than products obtained by the addition of conventional manganese salts if products of equal contents of manganese are compared.

By means of the zinc hexafluorosilicate catalyst of the present invention, it is possible to produce linear polyesters from terephthalic acid as one component and a glycol as the other component, the catalyst acting to accelerate the polycondensation of the diglycol terephthalate whether obtained by direct esterification of the terephthalic acid with the glycol or by ester-interchange from the more common dialkyl terephthalates employed as initial materials. This catalyst is especially suitable in the production of polyethylene terephthalate or somewhat modified polyesters of this polymer, wherein the terephthalic acid or its dimethyl ester is first converted into diethylene glycol terephthalate and the esterified or transesterified product is then polycondensed.

Other aliphatic or cycloaliphatic glycols can also be used instead of ethylene glycol, e.g., propylene glycol, butylene glycol, diethylene glycol, 1,4-dihydroxy-cyclohexane, or the like. In general, however, the best fiber-forming polyesters are those obtained when using ethylene glycol, and other glycols may then be used as modifying agents by replacing only a small proportion of the ethylene glycol, e.g., about 5 to 10%.

In addition to the terephthalic acid component, the esterification or condensation reaction mixtures may also contain other dicarboxylic acids such as isophthalic acid, naphthalene-dicarboxylic acid or adipic acid in varying amounts, usually not more than 10% of the total acid components. It is also possible to produce polyesters with the zinc hexafluorosilicate catalyst from two or more glycols and several different acids or their lower alkyl esters, provided that the reaction components are well mixed to give a uniform product. These and similar variations in the materials being polycondensed are well known in the art and are relatively independent of the particular catalyst which is employed for either transesterification or polycondensation.

The process of the present invention can also be carried out so as to incorporate various other additives into the polyester during its production. These additives are substantially inert under the reaction conditions or at least do not prevent one from obtaining a satisfactory fiber-forming product. Thus, it is possible to add any of the conventional matting agents, fillers, pigments, dyes, antioxidants or the like, to the polyester without any observable impairment of the excellent catalytic properties of zinc hexafluorosilicate.

The temperature and pressure conditions of the polyester-forming reactions are adopted according to conventional practice in using the catalyst of this invention. For example, the polycondensation reaction is carried out by heating the diglycol terephthalate under reduced pressure and at temperatures of from about 200° C. to 300° C. After reaching the desired degree of polycondensation, the resulting polyester is drawn off from the reaction vessel, e.g., as a continuous band, and is then solidified by cooling and broken up into particles or granules. Where transesterification occurs before the polycondensation, conventional procedures are also followed in suitable apparatus such that the ester-interchange takes place at an elevated temperature sufficient to split off the original lower alkanol component of the initial dialkyl terephthalate, while substituting the glycol component in its place. Since these polyester-forming reactions with other catalysts are well known in the art as are also the methods of subsequently producing polyester filaments or films, further elaboration of such methods and techniques are not necessary in explaining the improved catalyst and light-stabilizing features of the present invention.

The zinc hexafluorosilicate catalyst of the invention is of course quite useful in obtaining a linear polyester having any desired degree of polycondensation. In most cases, however, the molecular weight of the polyester product should be sufficiently high to achieve satisfactory fiber properties after spinning and stretching filaments. The degree of polycondensation or molecular weight can be readily determined by conventional means, e.g., by measuring the solution viscosity as a 1% solution of the polyester in meta-cresol at 25° C. It is also possible to measure the current which is drawn by a mechanical agitator in the polycondensation reaction vessel, this current being a measure of the viscosity of the molten polyester, sometimes referred to as the melt viscosity.

In order to determine the extent of color improvement in polyesters which have been produced with the aid of zinc hexafluorosilicate as the essential catalyst, it is possible to measure the remission degree of light having a particular wavelength which is irradiated against the finished polyester with a predetermined particle size. For example, the following procedure was utilized in determining the color improvement according to the examples below:

First, the polyethylene terephthalate cuttings or particles were ground and sifted through a double screen having a mesh size of 0.84 mm. and 0.6 mm. The finely ground particles deposited on the bottom of the 0.6 mm. screen were then collected for measurement of the degree of remission, i.e., using only those particles with a size between 0.6 and 0.84 mm. These fine particles were filled into a capsule and then pressed uniformly and firmly with a glass plate, in order to obtain a uniform surface. Samples prepared in this manner were measured with an "Elrepho" (remission photometer equipped with a filter $R46=460\mu$). The reflection of the sample was compared with magnesium oxide as a standard value of 100%.

The invention is further illustrated by but not restricted to the following examples.

*Example 1*

1000 grams of dimethyl terephthalate and 1000 grams of ethylene glycol were melted under a nitrogen atmosphere in a stainless steel autoclave of 3 liters capacity and having mounted thereon a packed column, and there was added as the catalyst 0.02 mol percent (approx. 0.021% by weight) of zinc hexafluorosilicate, with reference to the dimethyl terephthalate. The temperature was raised over a period of 120 minutes from 165° C. to 210° C. During this time, the ester-interchange reaction proceeded with the liberated methanol being distilled over the packed column out of the reaction mixture.

The reaction mixture was withdrawn after completion of the ester-interchange reaction into a 5-liter capacity stainless steel autoclave which was heated by indirect heat exchange with diphenyl as the heat transfer fluid, which was equipped with a finger paddle agitator and which was provided with a distillation bridge. At a diphenyl temperature of 280° C. over the next 30 minutes, the excess glycol was expelled and afterwards the autoclave was placed under a vacuum. After 20 minutes, a reduced pressure of 1 mm. was achieved. During the remaining condensation time, the pressure was reduced to 0.15 mm. After 1 hour and 38 minutes total condensation time, the resulting polymer melt was conducted in the form of a band into a tank filled with water, collected on a reel and finally cut up into particles. The polyethylene terephthalate product had a solution viscosity of 1.67, measured as a 1% solution in meta-cresol at 25° C., and a remission degree of 78.2%.

*Example 2*

In the same manner as described in Example 1 there were melted, ester-interchanged and then polycondensed 1000 grams of dimethyl terephthalate and 1000 grams of ethylene glycol, this time with the addition of 0.02 mol percent of manganese acetate and 0.02 mol percent of zinc hexafluorosilicate. The total polycondensation time amounted to one hour and 38 minutes. The final polyester product had a solution viscosity of 1.66 and a remission degree of 74.1%.

In another experiment carried out as in the preceding paragraph, about 0.02 mol percent of manganese hexafluorosilicate was substituted in place of the manganese acetate, and the polyester product exhibited not only a substantial reduction in discoloration but also good stability against the action of light.

For purposes of comparison, polyethylene terephthalate was produced in exactly the same manner but with the addition of 0.02 mol percent of manganese acetate and 0.02% by weight of antimony trioxide as the essential catalysts. The total polycondensation time amounted to one hour and 34 minutes. The polyester product had a viscosity of 1.67 and a remisison degree of 70.6%.

*Example 3*

In a stainless steel vessel, 50 kg. of dimethyl terephthalate and 45 kg. of ethylene glycol were melted in intimate admixture with 0.021% by weight of zinc hexafluorosilicate. While raising the temperature from 150° C. to 195° C. over a period of 2 hours and 50 minutes, about 19 liters of methanol were distilled over a packed column attached on top of the vessel, and after further raising the temperature to 220° C., about 13 liters of glycol were distilled off over the column. After a total time of 3 hours and 10 minutes of ester-interchange, the reaction mixture was transferred for polycondensation into a steam-heated stainless steel autoclave. At a steam temperature of 280° C. additional glycol was expelled and the autoclave was then evacuated. After 1 hour and 54 minutes of applying the vacuum, during which the pressure was reduced to 0.15 mm., the finished polyethylene terephthalate was extruded, solidified and granulated. Measured as a 1% solution in m-cresol at 25° C., the polymer had solution viscosity (LV) of 1.64 and a remission degree of 82%.

*Example 4*

In the same manner as described in Example 3, 50 kg. of dimethyl terephthalate and 45 kg. of ethylene glycol were transesterified in the presence of 0.024% by weight of manganese capronate, and after completion of the ester-interchange reaction as in Example 1, but with the addition of 0.021% by weight of zinc hexafluorosilicate, polycondensation was carried out. A total time of 2 hours and 18 minutes were required for the ester interchange, and calculated from the beginning of the evacuation, 1 hour and 39 minutes were required for the polycondensation. The entirely colorless polymer had a solution viscosity in m-cresol of 1.63 and a remission degree of 77%. Similar excellent results were achieved by using manganese hexafluorosilicate in place of the manganese capronate.

For comparison, an approximately equally light-stabilized polyethylene terephthalate was produced in the same manner as the preceding paragraph, except for the catalysts employed. As ester-interchange catalyst, there was added 0.035% by weight of manganese acetate and as polycondensation catalyst 0.02% by weight of antimony trioxide. After an ester-interchange time of 2 hours and 50 minutes and a polycondensation time of 1 hour and 52 minutes, a polyethylene terephthalate was obtained with a solution viscosity in m-cresol of 1.74 and a remission degree of 71.2%.

From the above examples, it will be apparent that zinc hexafluorosilicate is an excellent catalyst for the production of linear fiber-forming polyesters and yields a product which has considerably less discoloration. Also, the polyester product prepared with this catalyst exhibits a substantially improved stability against discoloration, especially when using a suitable light-stabilizer such as those described hereinabove. The additives of the invention do not require any other changes in the polyester-forming reactions and therefore permit the economical use of existing apparatus and reaction procedures.

The invention is hereby claimed as follows:

1. In a process for the production of a linear fiber-forming polyester by polycondensation under reduced pressure and at an elevated temperature of a diglycol terephthalate, the improvement which comprises: carrying out said polycondensation in the presence of zinc hexafluorosilicate as the essential polycondensation catalyst.

2. A process as claimed in claim 1 wherein said zinc hexafluorosilicate is incorporated in the polycondensation reaction mixture in an amount of about 0.01 to 0.1% by weight.

3. A process as claimed in claim 2 wherein diethylene glycol terephthalate is polycondensed to form polyethylene terephthalate as the linear polyester.

4. In a process for the production of a linear fiber-forming polyester in which a dialkyl terephthalate is transesterified with a glycol and the resulting diglycol terephthalate is then polycondensed under reduced pressure and at an elevated temperature, the improvement which comprises: carrying out both said transesterification and said polycondensation in the presence of zinc hexafluorosilicate as the essential catalyst for both reactions.

5. A process as claimed in claim 4 wherein the zinc hexafluorosilicate is finely distributed in the transesterification reaction mixture in an amount of about 0.01 to 0.1% by weight.

6. A process as claimed in claim 5 wherein dimethyl terephthalate is transesterified with ethylene glycol and the resulting diethylene glycol terephthalate is polycondensed to form polyethylene terephthalate as the linear polyester.

7. A process as claimed in claim 5 wherein a manganese salt as a light stabilizing agent is incorporated into said polyester during its production.

8. A process as claimed in claim 5 wherein manganese acetate is incorporated as a light stabilizing agent into said polyester during its production.

9. A process as claimed in claim 5 wherein manganese hexafluorosilicate is incorporated as a light stabilizing agent into said polyester during its production.

References Cited

UNITED STATES PATENTS

| | | | |
|---|---|---|---|
| 2,951,060 | 8/1960 | Billica | 260—75 |
| 3,031,946 | 4/1962 | Warshaw | 260—498 |
| 3,228,913 | 1/1966 | Nesty et al | 260—75 |

DONALD E. CZAJA, *Primary Examiner.*

G. W. RAUCHFUSS, Jr., *Assistant Examiner.*